June 4, 1929.  W. D. PATTERSON  1,715,564
COMBINATION WOODWORKING MACHINE
Original Filed Feb. 20, 1928   2 Sheets-Sheet 1
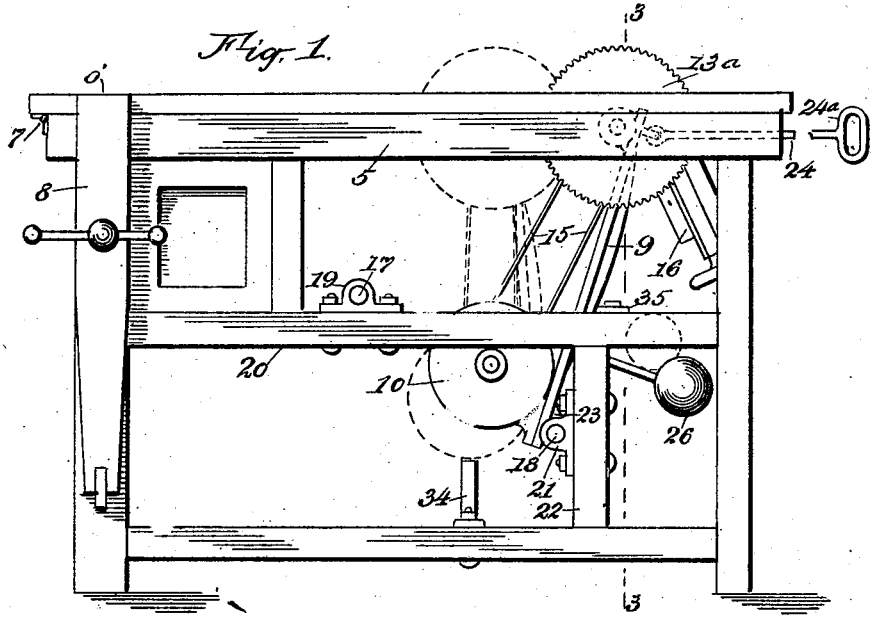
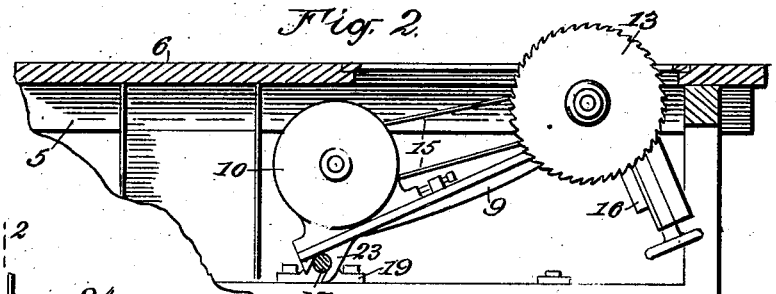
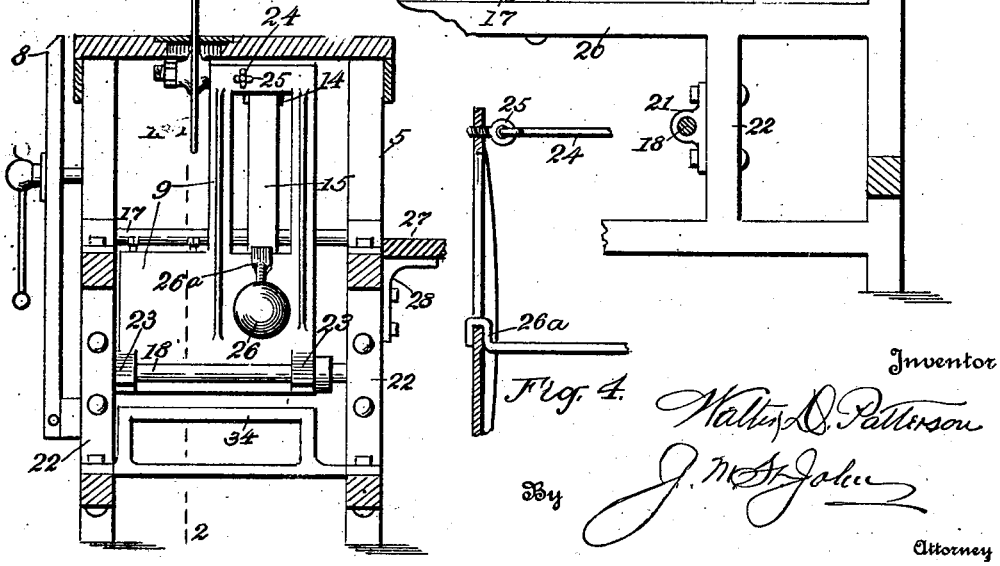

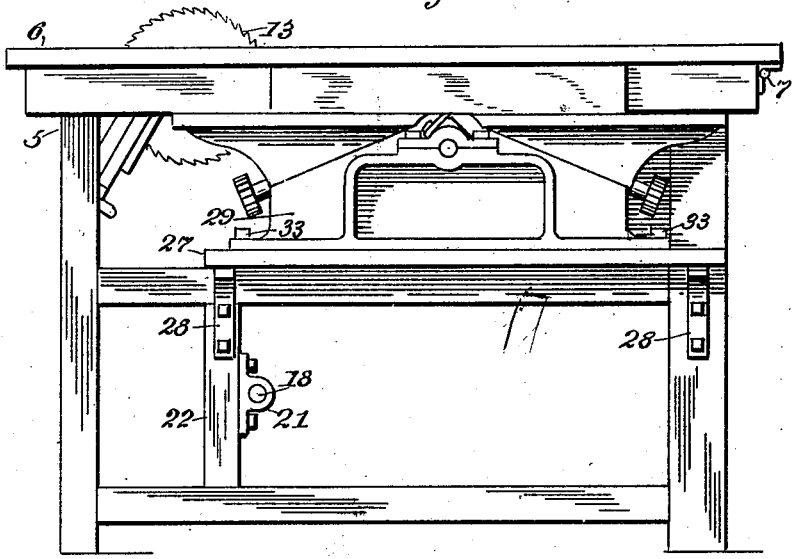
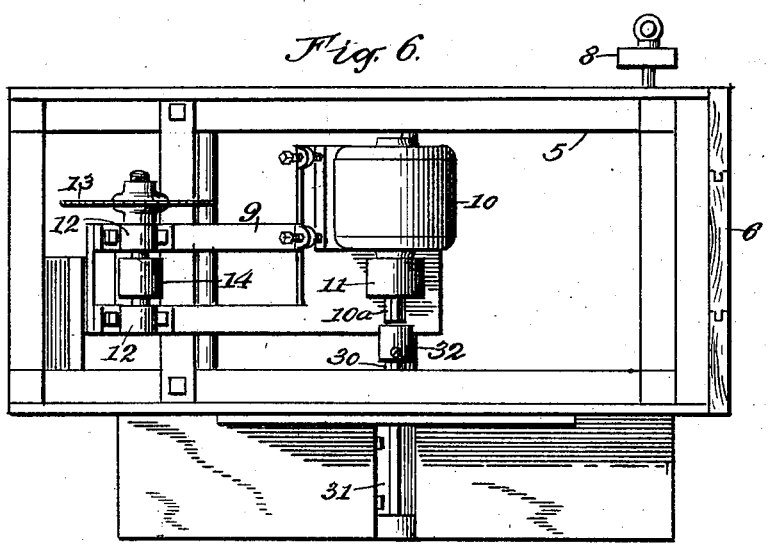

Patented June 4, 1929.

1,715,564

UNITED STATES PATENT OFFICE.

WALTER D. PATTERSON, OF CEDAR RAPIDS, IOWA.

COMBINATION WOODWORKING MACHINE.

Application filed February 20, 1928, Serial No. 255,673. Renewed April 18, 1929.

This invention relates to a combination of wood-working tools grouped about and connecting with a work-bench, and involves certain improvements upon the saw-bench described in Letters Patent No. 1,596,116 issued to this applicant and William E. Fleming on the seventeenth day of August, 1926.

The object of the present invention is to provide a work-bench with a detachable saw-frame and motor and mountings for the same which will adapt the apparatus for use as a rip-saw, vertically adjustable as desired, and by shifting the position of the saw-frame, for use as a swinging cut-off saw.

A further object of the invention is to provide the work-bench with an auxiliary motor-driven jointer directly and quickly connectible with the saw-operating motor, when in one of its set positions.

The invention is fully disclosed in the description and claims following, reference being had to the accompanying drawing, in which:—

Fig. 1 is a side elevation of a machine embodying the invention, with the saw-frame set for cross-cutting. Fig. 2 is a fragmentary elevation of the machine, sectional in the line 2—2 of Fig. 3, and showing the saw in the slitting position. Fig. 3 is a cross-section in the line 3—3 of Fig. 1. Fig. 4 is a fragmentary longitudinal section of the saw-frame, showing means for swinging and counterbalancing the same. Fig. 5 is an elevation of the apparatus on the side opposite that shown in Fig. 1, and shows a jointer attached to the bench and in position for operation. Fig. 6 is a plan view of the same, with the saw-table elevated.

The main frame of the apparatus, 5, forms essentially a work bench, having a working top 6, tiltable by means of hinges at 7, and serviceable as a saw-table. A vise 8 of a familiar type calls for no special description.

A cast-iron frame 9 serves as a support for an electric motor 10 provided with a suitable pulley 11. At the narrow, upper end of the frame, in bearings 12 is mounted a saw arbor for a saw 13 or 13ᵃ (rip and cut-off, respectively), and provided with a pulley 14. This and the motor pulley connect operatively by a belt 15. In so far the apparatus is practically the same as in the patent above referred to. In the former patent, however, the saw-frame, which was relatively considerably longer than herein shown, was permanently, but rockably attached to a cross-shaft, and was thus practically inseparable from the bench. It was provided with an adjustable raising and lowering support for the upper end of the frame, and this is indicated by the numeral 16. As it is fully described in said patent no particular description is deemed necessary.

As above noted, this invention contemplates the mounting of the saw-frame so that as a slitter the same may be raised and lowered as formerly, and that the frame may be shifted bodily from the slitting position to a nearly vertical position, and be then operable as a swinging cut-off saw. To this end the frame is provided with a pair of cross-shafts, 17 and 18, the former carried in bearings 19 on the longitudinal frame-bars 20, and the latter in bearings 21 attached to the uprights 22. The saw frame is not secured to either shaft permanently, but is provided with diagonal open bearings 23, and merely rests on the supporting shafts by gravity. This permits the shifting of the saw frame, as indicated in Figs. 1 and 2, the change being made in a moment. It also admits of the easy and quick removal of the whole saw unit from the bench frame, whereby a single operator can carry the apparatus from place to place, the bench as one load and the saw unit as another.

To swing the saw, a pull-rod 24 is provided, suitably connecting with the upper end of the saw-frame, as by an eye-bolt 25, and operable by a hand-hold 24ᵃ. To counterbalance the overhanging weight of the motor a counterpoise 26 is hung by its shank 26ᵃ on the saw-frame, as shown in Fig. 4. This may be detached by simply unhooking, to lighten the weight of the saw unit, if too heavy for easy manipulation with it attached. Abutment stops 34 and 35 limit the movement of the swinging saw frame to and fro.

In Figs. 3, 5 and 6 is shown another accessory. To the side of the bench opposite the vise, on a suitable support 27 carried by brackets 28, is mounted a jointer 29 of a standard type, needing no description. As shown in Fig. 6, the arbor 30 for the jointer cutter-head 31 and the motor-shaft 10ᵃ are extended to nearly meet. When the saw-frame is in the position shown in Fig. 2 these shafts are in exact alignment, and may then be easily and quickly coupled, as by a slip-collar 32. The cutter-head is thus made to revolve at motor speed. With the saw and jointer disposed as herein shown they evidently turn in opposite directions. It is desirable therefore to use a reversing motor, and one of high speed rating to secure the desired convenience and efficiency, particularly in the jointer.

The jointer itself may be quickly detached from the bench frame by unscrewing bolts 33, so that it is possible for a single operator to load the whole apparatus, and transport it from one job to another.

The machine so organized is designed to operate on the premises where house finishing and the like is being done, and to greatly speed up and simplify much of the work that is commonly done by hand.

Having thus described my invention, I claim:

1. Combined with a sawing unit comprising a frame a motor carried thereby and a saw-arbor in operative connection with the motor, a bench frame provided with a cross-shaft to support the lower end of the frame and an adjustable support for the upper end, and a lower cross-shaft set to hold the saw-frame in nearly a vertical position, and means connecting with the frame whereby it may be swung to and fro.

2. The combination of a bench frame carrying cross-shafts disposed at different levels, a saw-frame provided with open bearings to engage said shafts, whereby it rests by gravity in an inclined position when set to remain stationary and nearly vertical when in a swinging position, means for supporting the free end of the frame in such stationary position and for moving it to and fro when in swinging position.

3. The combination with a supporting saw-bench frame, and carrying a cross-shaft set midway below the to-and-fro working movements of a swinging saw, a frame carrying a saw, and engaging the shaft by open bearings, a motor in operative connection with the saw, mounted on one face of the saw-frame, and a detachable, oppositely projecting weight to counterbalance the weight of said motor.

4. The combination of a supporting saw-bench, a sawing unit comprising a saw-frame, a saw-arbor at the free end thereof, a reversing motor at the opposite end having an extending shaft and coupling means, a support for the motor end of the saw-frame, a jointer disposed at one side of the saw-bench, with a working-head arbor extended to nearly meet the motor-shaft, with which it is aligned, and having coupling means adapted for connetion with the motor-shaft.

In testimony whereof I affix my signature.

WALTER D. PATTERSON.